United States Patent
Girlich

(10) Patent No.: US 8,255,095 B2
(45) Date of Patent: Aug. 28, 2012

(54) MODULAR AVIONICS SYSTEM OF AN AIRCRAFT

(75) Inventor: Heinz Girlich, Hamburg (DE)

(73) Assignee: Airbus Operations GmbH (DE)

( * ) Notice: Subject to any disclaimer, the term of this patent is extended or adjusted under 35 U.S.C. 154(b) by 684 days.

(21) Appl. No.: 12/085,012

(22) PCT Filed: Nov. 16, 2006

(86) PCT No.: PCT/EP2006/011010
§ 371 (c)(1),
(2), (4) Date: Aug. 4, 2009

(87) PCT Pub. No.: WO2007/057189
PCT Pub. Date: May 24, 2007

(65) Prior Publication Data
US 2010/0153684 A1    Jun. 17, 2010

(30) Foreign Application Priority Data

Nov. 18, 2005 (DE) .......................... 10 2005 055 000

(51) Int. Cl.
*G01C 23/00* (2006.01)
(52) U.S. Cl. ............................. 701/3; 712/225; 326/101
(58) Field of Classification Search .............. 701/3, 213, 701/29, 225
See application file for complete search history.

(56) References Cited

U.S. PATENT DOCUMENTS

| | | | |
|---|---|---|---|
| 4,658,359 A | 4/1987 | Palatucci et al. | |
| 5,031,092 A | 7/1991 | Edwards et al. | |
| 5,361,367 A | 11/1994 | Fijany et al. | |
| 5,506,963 A | 4/1996 | Ducateau et al. | |
| 5,560,027 A | 9/1996 | Watson et al. | |
| 5,577,204 A | 11/1996 | Brewer et al. | |
| 7,509,513 B2* | 3/2009 | Toillon et al. | 713/375 |
| 2003/0047997 A1* | 3/2003 | Bernier | 307/9.1 |
| 2003/0130791 A1* | 7/2003 | McIntyre | 701/213 |
| 2004/0078614 A1* | 4/2004 | Toillon et al. | 713/500 |

(Continued)

FOREIGN PATENT DOCUMENTS

EP    0 570 729    11/1993

(Continued)

OTHER PUBLICATIONS

Fraboul et al., "Modeling and Simulation of Integrated Modular Avionics", pp. 102-108, (1998).

(Continued)

*Primary Examiner* — Helal A Algahaim
(74) *Attorney, Agent, or Firm* — Lerner, David, Littenberg, Krumholz & Mentlik, LLP

(57) ABSTRACT

A modular avionics system includes several cabinets arranged at various locations in an aircraft and interconnected in a network. The cabinets are used for controlling or processing signals from and to sensors, actuators and other systems of the aircraft. The system includes parallel processors, for example transputers. The cabinets comprise at least two core processor modules (CPM1, CPM2) and at least two input/output modules (IOM1, IOM2). The input/output modules (IOM1, IOM2) serve as interfaces to the systems to be controlled, and serve for the control and intermediate storage of the data flowing into and out of the cabinet. Each core processor module (CPM1, CPM2) communicates independently with each IOM module and CPM module by way of links; and in each core processor a number of independent system programs works under the control of an operating system.

2 Claims, 2 Drawing Sheets

U.S. PATENT DOCUMENTS

Figure 1:
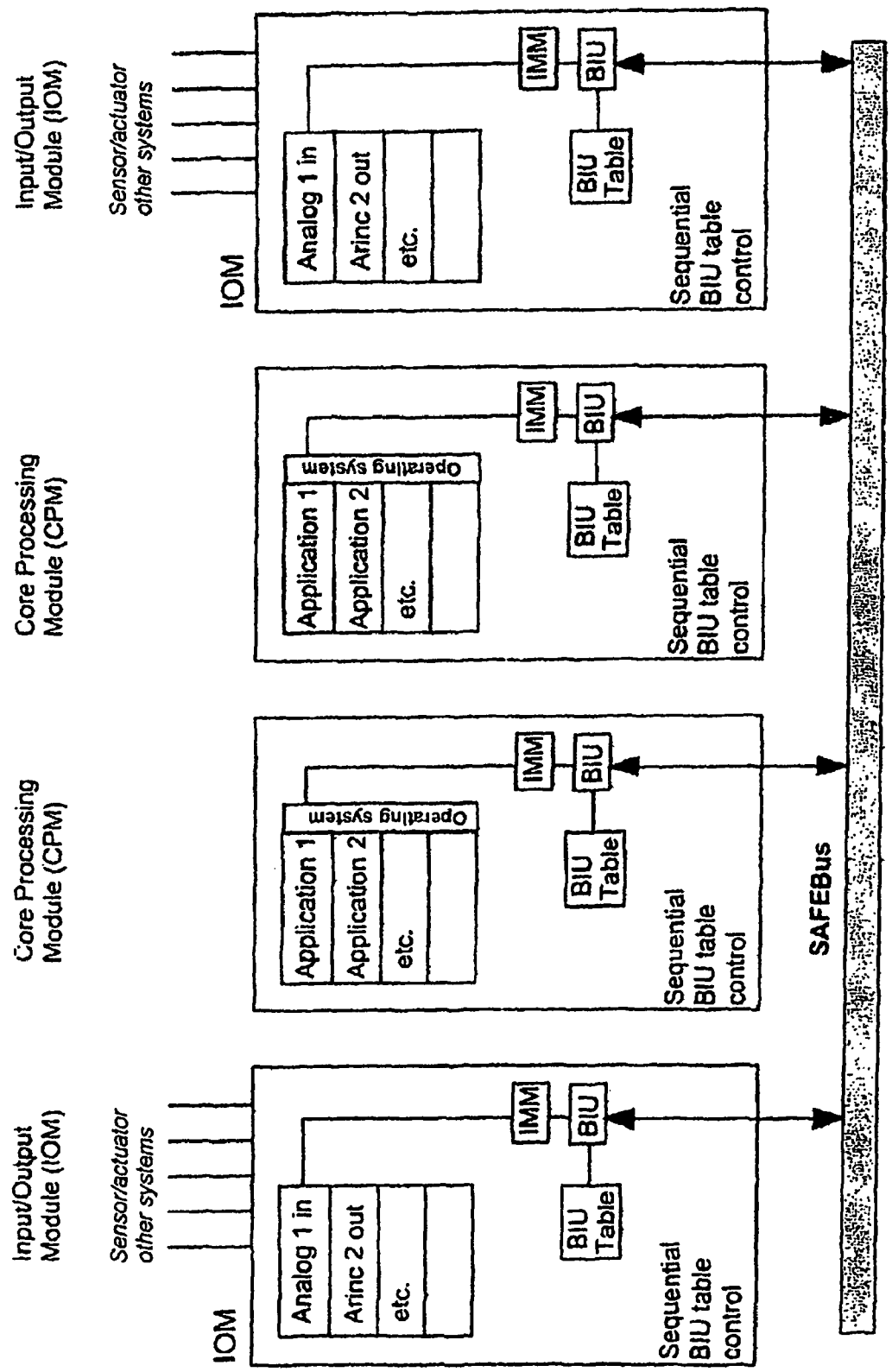

2007/0239912 A1* 10/2007 Fletcher et al. ............... 710/104
2009/0112379 A1* 4/2009 Geiter ............................. 701/3

FOREIGN PATENT DOCUMENTS

| RU | 12478 | 10/2000 |
|---|---|---|
| RU | 2163728 C1 | 2/2001 |
| RU | 99120177 A | 8/2001 |
| WO | 2005/098641 | 10/2005 |

OTHER PUBLICATIONS

Nesson, T., "Randomized Oblivious Minimal Routing Algorithims for Multicomputers," (Kap. 2.2.1 Completely Connected Networks, pp. 17-18.

Urban, G. et al, "A survivable avionics system for space applications", pp. 373-381, (1998).

Ozols, J. et al, "Fault tolerant virtual machine architecture for advanced avionics applications", pp. 231-236, (1993).

Williams, T., "Real-time kernel exploits transputer for multiprocessor embedded systems", 50; 50-52 (1990).

Yann-Hang Lee, et al. "An integrated scheduling mechanism for fault-tolerant modular avionics systems", pp. 21-29 (1998).

H. A. Thompspn et al., "Fault-tolerant transputer-based controller configurations for gas-turbine engines", Control Theory and Applications, IEE Proceedings D, IEEE, 1990, vol. 137, Pt. D, No. 4, pp. 253-260.

* cited by examiner

MODULAR AVIONICS SYSTEM OF AN AIRCRAFT

REFERENCE TO RELATED APPLICATIONS

This application claims the benefit of the filing date of German Patent Application No. 10 2005 055 000.2 filed Nov. 18, 2005, the disclosure of which applications is hereby incorporated herein by reference.

FIELD OF THE INVENTION

The invention relates to a modular avionics system of an aircraft according to the characterising portion of claim 1.

TECHNICAL BACKGROUND OF THE INVENTION

The avionics architecture presently used in aircraft is based on the specifications according to Arinc 700. According to these specifications, manufacturers of avionics devices provide a specially tailored controller that is accommodated in a line replaceable unit (LRU) for each function. Each LRU thus comprises the following components: power supply, processor, I/O modules and others.

With the use of integrated modular avionics, improved integration by utilising the computing power of microprocessors for several tasks (resource sharing) becomes possible. A reduction in the number of components, and standardisation of components are further advantages.

A known IMA-(integrated modular avionics) architecture provides several cabinets at various locations in the aircraft. For data exchange all models are interconnected by way of a backplane bus (Arinc 659, currently SAFEbus by Honeywell).

Sensor data of the various functions are fed to the core processor by way of the input modules and the backplane bus. In the core processor, an operating system determines which system software (application) is to be used at what time. The data is directly transmitted to the associated software. After completion of processing, the data is returned via the backplane bus to the output module from where it is transmitted to actuators or other systems.

The cabinets in turn are interconnected in a network (Arinc 629).

In this solution the backplane bus represents a bottleneck. In order to prevent a collapse, the data has to be determined deterministically for transmission.

Several attempted solutions for managing these problems are known. For example, in U.S. Pat. No. 5,506,963 a real-time processor system is implemented in that a coprocessor is used which manages the time slices of a specified timeframe for the processor. These time slices can be of different duration, with allocation to one or several installed layouts being determined by the function/application. In this solution a central databus is used with deterministic data traffic. Tools for setting up the data traffic are necessary, data conflicts can arise, and changes in the function are only possible if at the same time the bus data structure is adapted.

According to U.S. Pat. No. 4,658,359 a computer is used to manage a plurality of computers in a complex avionics system. A single user can thus process a plurality of functions/applications from one display screen. Here, operation and modification of applications of a communication system by means of an executive computer are in the foreground. The use as an integrated modular avionics system with transputers is not considered.

According to U.S. Pat. No. 5,361,367 a number of single-instruction multiple data (SIMD) processors are accommodated in a computer. Two sets of respectively three individual processors are controlled by a master computer and are connected to a plurality of registers. These SIMD processors are linked, for data exchange, to form a ring arrangement or pipeline arrangement. This is a high-speed processor. However, the data bus problems at high data rates and in the case of distributed tasks remain.

According to EP 0,570,729 A2 an individual chip houses eight processors that are linked by way of a cube topology. Compared to conventional microprocessors there are fewer pins, and the memory time is shortened. Here again, the solution shows an improved high-speed processor chip.

SUMMARY OF THE INVENTION

Consequently it is the object of the invention to design a modular avionics system such that with implementation of deterministic data traffic, no central data bus is used, wherein no data conflicts must occur in the data buses considered.

This object is met by the measures according to claim 1. An expedient embodiment is provided with claim 2.

According to the invention it is proposed that the system comprises parallel processors, for example transputers; the cabinets comprise at least two core processor modules (CPM1, CPM2) and at least two input/output modules (IOM1, IOM2); the input output modules (IOM1, IOM2) serve as interfaces to the system to be controlled and serve for control and intermediate storage of the data flowing into and out of the cabinet; each core processor module (CPM1, CPM2) communicate independently with each IOM module and CPM module by way of links; and in each core processor a number of independent system programs work under the control of an operating system.

With the use of parallel processors, for example transputers, the bottleneck represented by the backplane bus no longer exists, because these parallel processors can communisate with several processors by way of separate direct data lines (links).

SHORT DESCRIPTION OF THE DRAWINGS

Figure 2:
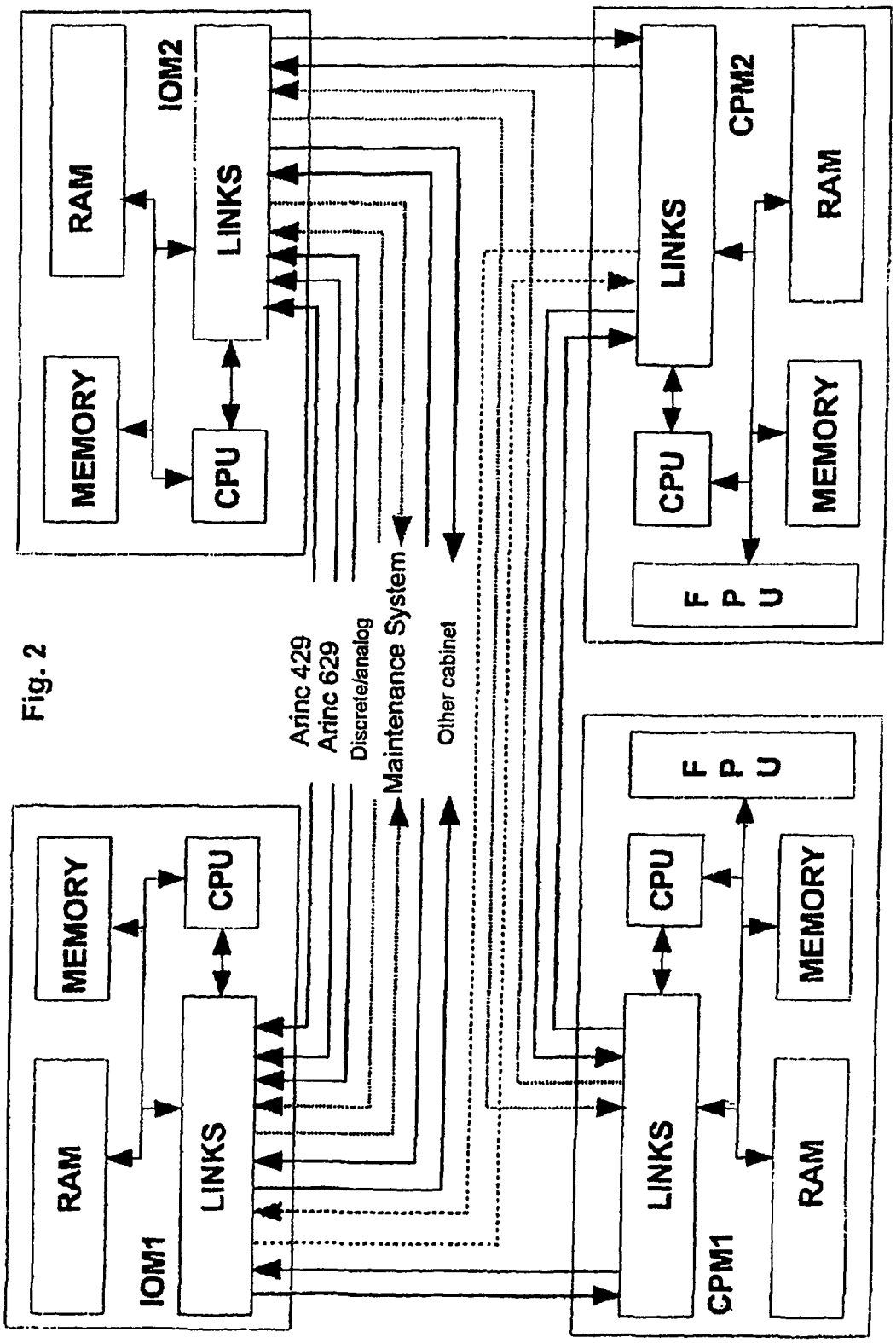

Further details of the invention are shown in the drawings, which show prior art and the invention respectively, as follows:

FIG. 1 shows the diagrammatic configuration of an IMA cabinet according to prior art; and FIG. 2 shows the configuration according to the invention.

DETAILED DESCRIPTION OF EXEMPLARY EMBODIMENTS

A known IMA-(integrated modular avionics) architecture according to FIG. 1 provides several cabinets at various locations in the aircraft. Each cabinet comprises the following modules: power supply modules (PSM), I/O modules (IOM), and core processing modules (CPM). All modules receive electrical power from the power supply and are interconnected for data exchange by way of a backplane bus (Arinc 659—a SAFEbus by Honeywell).

The sensor data of the various functions are transmitted to the core processor by way of the input modules and the backplane bus. In the core processor an operating system determines which system software (application) is to be used at what time. The data is directly transmitted to the associated software. After completion of processing, the data are returned via the backplane bus to the output module from where they are transmitted to actuators or other systems. The cabinets in turn are interconnected in a network (Arinc 629).

In this solution the backplane bus represents a bottleneck. In order to prevent a collapse, the data have to be determined deterministically for transmission.

In order to obviate the need for such a backplane bus and in this way to avoid the associated bottleneck, an architecture for a cabinet is proposed, which architecture is based on parallel processors, for example transputers. The IMA architecture according to FIG. 2 shows this configuration.

For reasons of redundancy the cabinet comprises at least two core processor modules (CPM1, CPM2) and at least two input/output modules (IOM1, IOM2).

The IOMs are used as an interface to the sensors, actuators, systems and buses. They are responsible for control and intermediate storage of the data to and from the cabinet.

Each core processor independently communicates, by way of links, with each IOM module and CPM module. In the CPM a number of independent system programs work under the control of an operating system.

This architecture, which is based on transputers, provides the following advantages when compared to prior art:
1. No central data bus and no bidirectional databuses but only unidirectional databuses are used so that no data conflicts in the buses can occur.
2. No tools for the design of deterministic data traffic are required.
3. Changes in the applications are possible without making a change of a bus data-structure necessary.

The invention claimed is:
1. A modular avionics system of an aircraft, comprising:
a plurality of cabinets arranged at various locations in the aircraft and interconnected in a network,
wherein each of the plurality of cabinets comprises:
a first and a second core processor modules (CPM1, CPM2) comprising a first and a second parallel processor, respectively; and
at least a first and a second input/output modules (IOM1, I0M2) configured to serve as interfaces to a plurality of systems to be controlled, and to serve for the control and intermediate storage of the data flowing into or out of the plurality of cabinets, said plurality of systems comprising sensors, actuators and buses of the aircraft;
wherein each of the first and second core processor modules (CPM1, CPM2) communicates independently, by way of a plurality of unidirectional separate direct data lines, with each of the first and second input/output modules and with the other of the first and second core processor modules;
wherein in each of the first and second core processor modules, a plurality of independent system programs work under the control of a first and a second operating system, respectively; and
wherein the plurality of cabinets are configured to be used for controlling and/or processing signals that are transmitted from and/or to the first and second parallel processors and one or more of the plurality of systems.

2. The modular avionics system according to claim 1, wherein the first and second parallel processors comprise a first and a second transputer, respectively.

* * * * *